Sept. 16, 1924.

H. H. MERCER 1,509,080

STONEWORKING MACHINE

Original Filed March 4, 1918    6 Sheets-Sheet 1

Sept. 16, 1924.  H. H. MERCER  1,509,080
STONEWORKING MACHINE
Original Filed March 4, 1918   6 Sheets-Sheet 2

Inventor:
Henry H. Mercer.
by Horace L. Powell
att'y.

Sept. 16, 1924.  H. H. MERCER  1,509,080
STONEWORKING MACHINE
Original Filed March 4, 1918   6 Sheets-Sheet 3
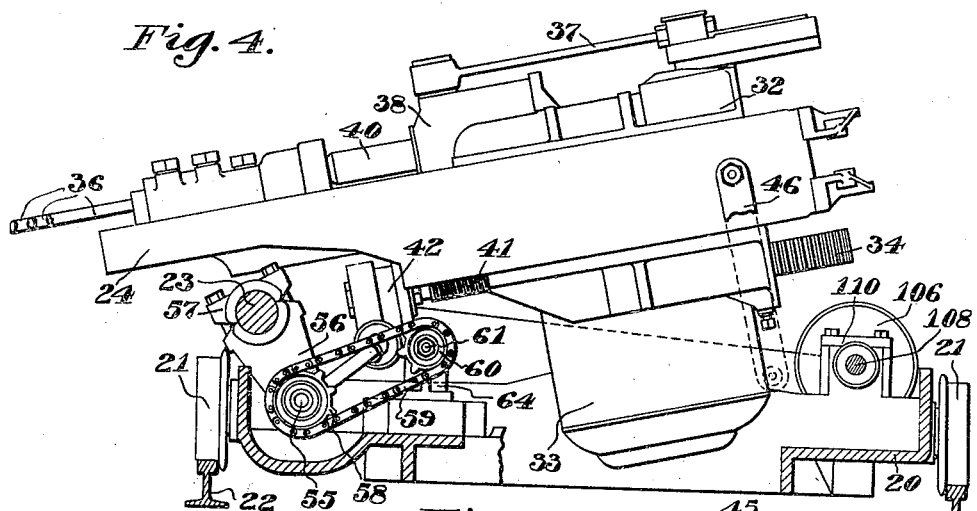
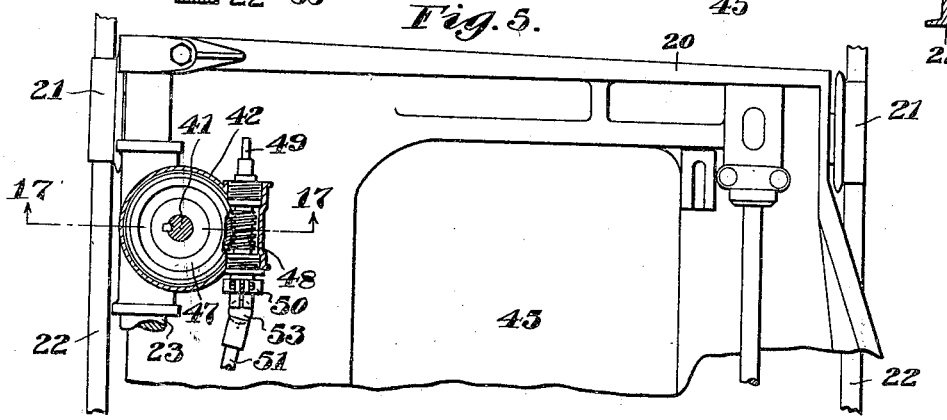
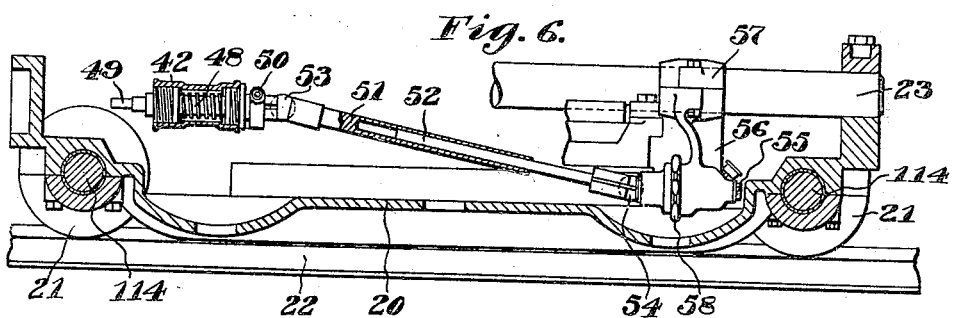
Inventor:
Henry H. Mercer.
by
[signature]
Atty.

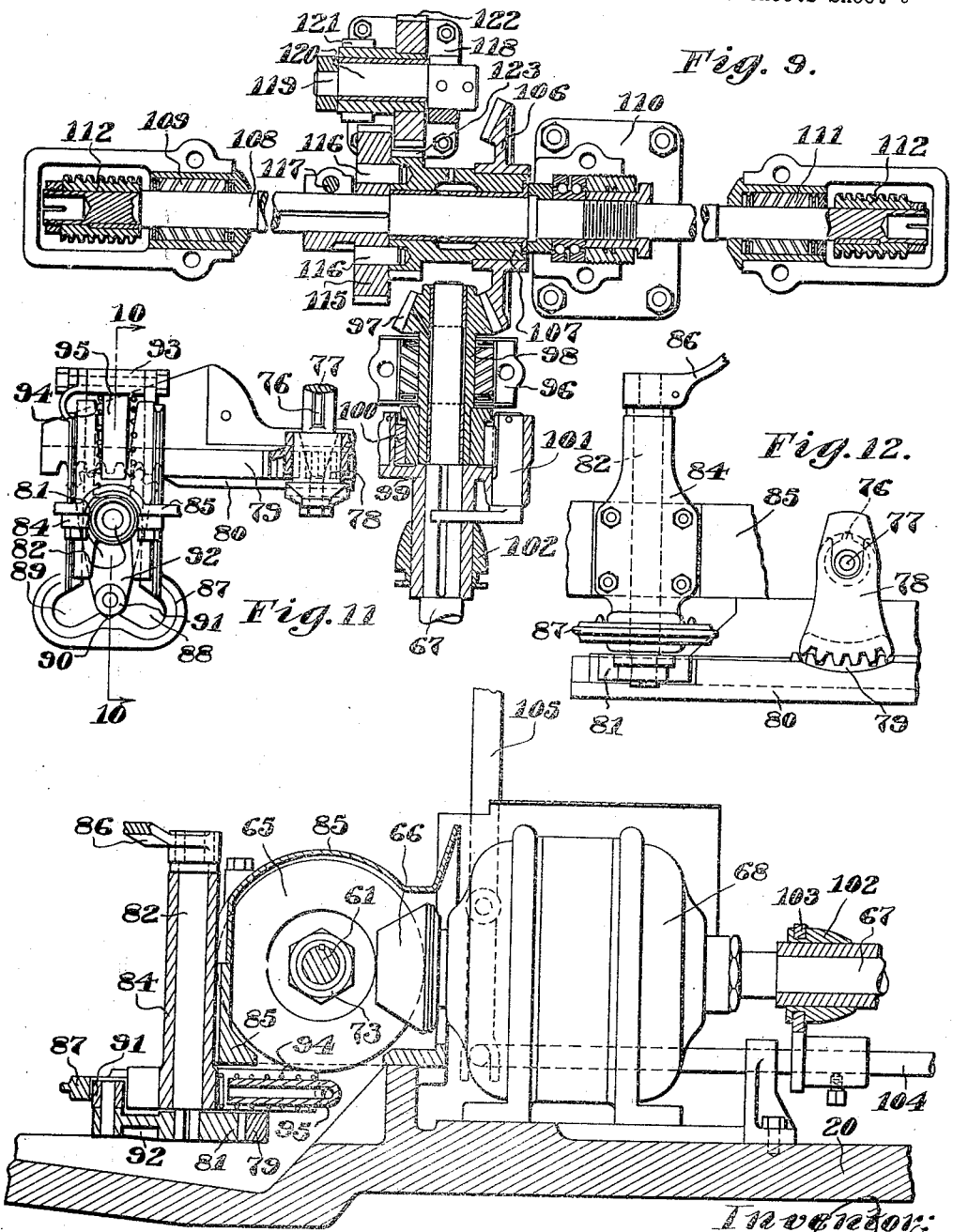

Sept. 16, 1924.  H. H. MERCER  1,509,080
STONEWORKING MACHINE
Original Filed March 4, 1918    6 Sheets-Sheet 6

Inventor:
Henry H. Mercer.
by
 atty.

Patented Sept. 16, 1924.

1,509,080

UNITED STATES PATENT OFFICE.

HENRY H. MERCER, OF CLAREMONT, NEW HAMPSHIRE, ASSIGNOR TO SULLIVAN MACHINERY COMPANY, A CORPORATION OF MASSACHUSETTS.

STONEWORKING MACHINE.

Application filed March 4, 1918, Serial No. 220,265. Renewed February 23, 1924.

*To all whom it may concern:*

Be it known that I, HENRY H. MERCER, a citizen of the United States, residing at Claremont, in the county of Sullivan and State of New Hampshire, have invented certain new and useful Improvements in Stoneworking Machines, of which the following is a full, clear, and exact specification.

This invention relates to stone working machinery, and more particularly, although not exclusively, to channeling machines of the general type shown in Letters Patent Nos. 1,228,041 and 1,250,609, granted to me May 29, 1917, and December 18, 1917, respectively, a machine of this type comprising, in general, a truck provided with a motor adapted to propel the same along a track upon a quarry floor or other surface to be cut, cutting appliances, carried by a standard mounted to tip transversely of the truck about an axis extending longitudinally thereof, or to swing longitudinally of said truck about an axis transverse thereto, in order to permit undercutting, said machine preferably being adapted to be operated by a swinging mechanism such as is disclosed in Letters Patent No. 1,228,041, above referred to, for automatically swinging said standard as the machine approaches the limit of its travel, (the swinging mechanism not being shown herein as the same forms no part of the present invention) and said standard being also longitudinally adjustable on the truck to position the same adjacent either end thereof, and feeding means for moving the cutting appliances toward and from the work.

The invention has for one of its objects to provide improved transmission mechanism for actuating the feeding means for the cutting appliances from the truck motor, said transmission being sufficiently flexible to perform its intended function irrespective of any angular or longitudinal adjustment of the standard, and being of such a character as conveniently to permit the operation of the feeding means in either direction or to suspend the operation thereof.
Another object of the invention is to provide improved and simplified transmission mechanism for operatively connecting the truck motor with the truck propelling means, said mechanism being of such a character as to permit the same to be conveniently controlled and adjusted to cause the truck to be propelled in either direction and at any required speed, or to be held in a stationary position.

A further object of the invention is to provide a channeling machine of such construction and arrangement as to permit the standard to be tipped into an approximately horizontal position without interference with the mechanism on the standard by the truck frame and parts carried thereby.

A still further object of the invention is to provide, in a channeling machine having a longitudinally swinging standard for undercutting, improved variable speed frictional transmission mechanism for propelling the truck, said mechanism being of such a character as to permit the truck speed to be accurately controlled in accordance with the requirements as the standard is swung.

The foregoing and other objects of the invention, together with means whereby the same may be carried into effect, will best be understood from the following description of certain forms or embodiments thereof illustrated in the accompanying drawings. It will be understood, however, that the particular constructions described and shown have been chosen for illustrative purposes merely, and that the invention, as defined by the claims hereunto appended, may be otherwise embodied without departing from the spirit and scope thereof.

In said drawings,—

Fig. 4 is a transverse vertical section on line 4—4 of Figure 2, showing the standard adjusted into an approximately horizontal position, parts being shown in laterally adjusted position to provide a clear showing of the details of construction;

Fig. 5 is a partial horizontal section substantially on line 5—5 of Fig. 1.

Fig. 6 is a longitudinal vertical section taken substantially on line 6—6 of Fig. 2, the bracket on the trunnion bar being shown in a different position.

Fig. 9 is a horizontal section on line 9—9 of Fig. 3.

Fig. 10 is a vertical section substantially on line 10—10 of Figs. 2, 3, and 11.

Fig. 11 is a plan view, partly broken away, of the controlling means for the feeding mechanism.

Fig. 12 is a front elevation of the parts shown in Fig. 11.

Fig. 17 is a detail vertical section on line 17—17 of Fig. 5.

The machine herein shown is similar, as to its general organization and operation, to the machines shown in my prior Letters Patent above referred to, to which reference may be had for more complete disclosure of parts not fully shown and described in the present case, although the present invention contemplates the modification and improvement of certain of the mechanisms and constructions involved in the machine, as will hereinafter be fully described and explained.

Figure 1:
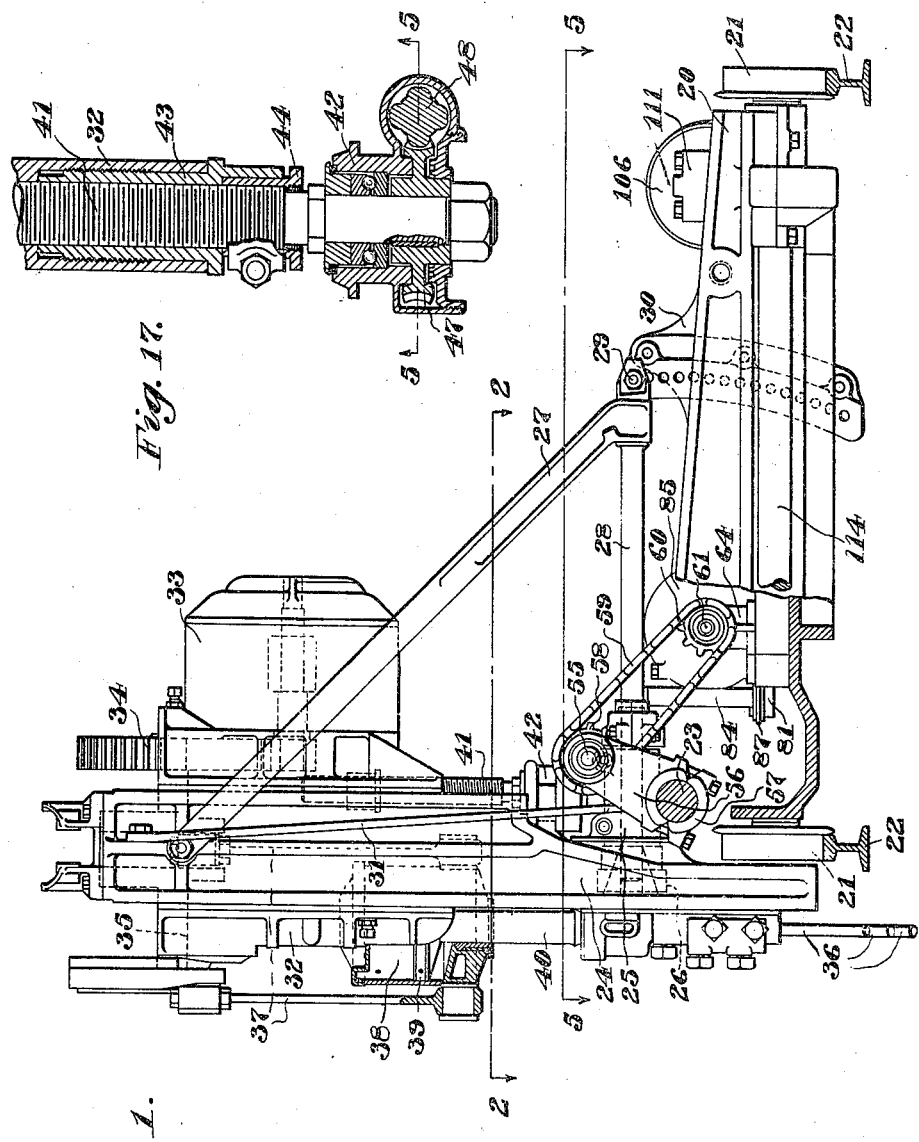
Fig. 1 is an end elevation, partly broken away, of the complete machine.
Figures 2, 3:
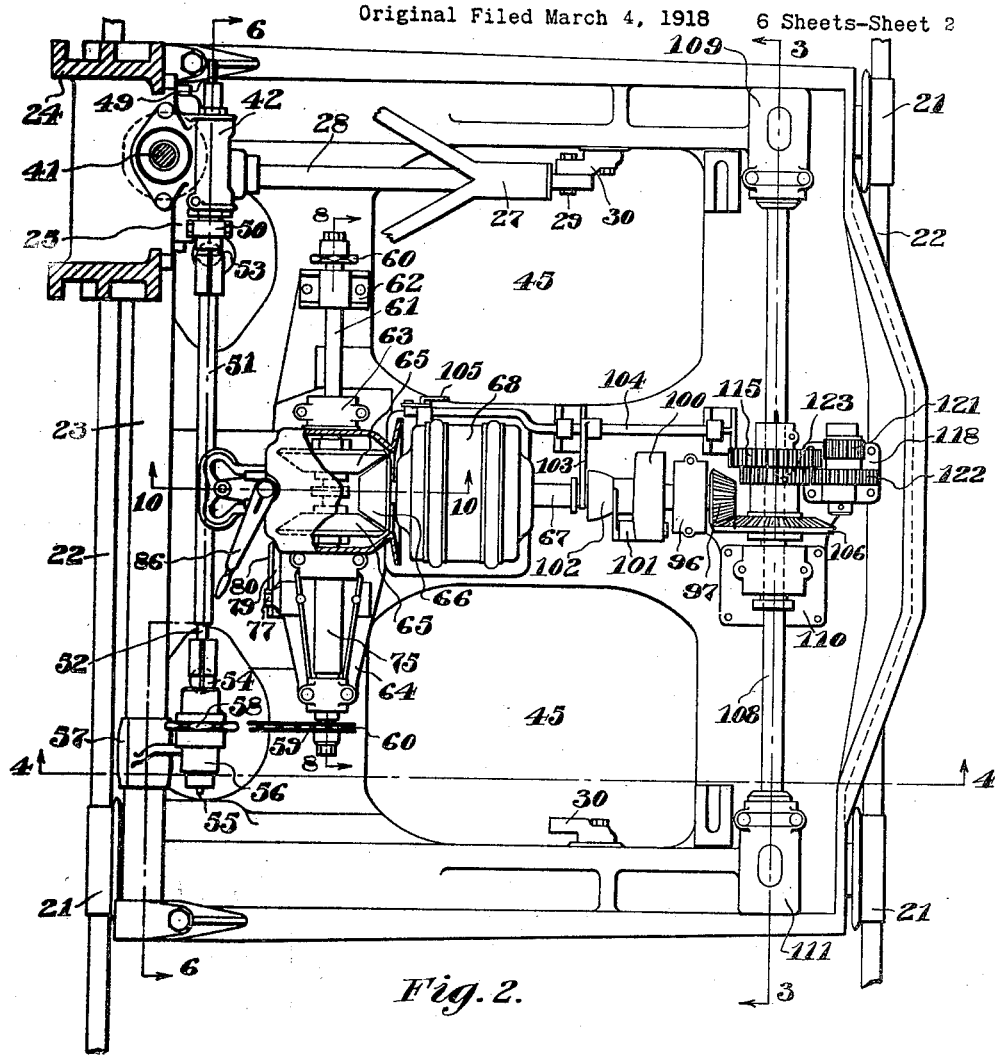
Fig. 2 is a horizontal section, substantially on line 2—2 of Fig. 1, with certain parts omitted or broken away.
Fig. 3 is a vertical longitudinal section on line 3—3 of Fig. 2.

Referring to Figs. 1 and 2, the machine comprises a truck 20 mounted on wheels 21 adapted to run on tracks 22, said truck being provided with a longitudinally extending trunnion bar 23 on which is mounted a standard 24. Said standard is secured to the trunnion bar by a bracket 25, said bracket being angularly and longitudinally adjustable on said trunnion bar to permit said standard to be tipped transversely of the machine about the axis of said trunnion bar and to be secured to said trunnion bar adjacent either end thereof in accordance with the direction of travel of the truck, as will be familiar to those skilled in the art. The standard 24 is pivoted at 26, as indicated in dotted lines on Fig. 1, to the bracket 25, said pivotal mounting permitting said standard to swing longitudinally of the machine about an axis transverse thereto. The standard 24 is braced and retained in its adjusted position about the trunnion bar 23 by means of an inclined brace member 27 having a forked upper end detachably secured to the upper portion of said standard and connected at its lower end to a shaft or bracing member 28 having an end removably received in a socket or opening in the bracket 25, said member 28 being preferably arranged coaxially with the pivot 26. The shaft or bracing member 28 is provided at its rear end with a transverse opening to receive a bolt 29 engageable with any one of a series of openings in a segmental bracket 30 secured to the truck frame, whereby the standard 24 may be adjusted about the trunnion bar and retained in any desired angular position thereon. As shown in Fig. 2, a bracket 30 is preferably provided at each end of the truck frame in order to cooperate with the bracing devices in either longitudinal position of the standard. Said standard, during the normal operation of the machine, may be held against swinging movement about the pivot 26 by means of a bracing member 31 secured at its upper end to said standard and at its lower end to the trunnion bar.

Mounted for vertical sliding movement on the standard 24 is a head 32 on which is carried, at the rear or inner side of the standard, an electric or other motor 33 connected by gearing 34 with a crank shaft 35 journaled in the head 32. The crank shaft 35 is operatively connected with the cutting appliances, herein shown as a gang of channeling tools 36, by suitable means whereby rotation of said shaft causes vertical reciprocation of said cutting appliances. For convenience, said means, as herein shown, are of substantially the form disclosed in my co-pending application Serial No. 242,261, filed June 27, 1918, and comprise connecting rods 37 connected at their upper ends to cranks on the shaft 35, and at their lower ends to a cylinder 38 containing a piston 39 connected by a piston rod 40 with the channeling tools 36, said cylinder and piston serving to cushion and otherwise control the impact of the tools. The particular means for actuating the cutting appliances, however, specifically form no portion of the present invention and may be of any suitable character.

In order to permit the cutting appliances or tools 36 to cut on a plane forming a wide angle to the vertical, as in channeling a side wall, the frame of the truck 20 is provided with recesses or openings 45 to receive the motor 33 which, as above explained, is mounted at the rear of the standard 24, thereby permitting said standard to assume an approximately horizontal position, as shown in Fig. 4. Preferably two openings or recesses 45 are provided at opposite sides, respectively, of the longitudinal center of the truck frame, as shown in Fig. 2, to accommodate the motor 33 in either position of longitudinal adjustment of the standard. In order to permit said standard to be adjusted into the position of extreme angularity shown in Fig. 4, and to support the same in said position, the bracing members 27 and 28 are removed and a special bracing member 46 employed to connect the upper end of the standard with the truck frame.

The head 32 may be fed longitudinally of the standard 24, to move the cutting appliances 36 toward and from the work, by means of a feed screw 41 (see Figs. 1, 2, 4, 5, and 17) journaled at its lower end in a bracket 42 carried by the standard 24, said feed screw being held against longitudinal movement in said bracket and being in threaded engagement with a feed nut or sleeve suitably secured to the head 32. As shown in Fig. 17, said feed nut or sleeve is preferably formed in two parts 43 and 44 relatively adjustable to compensate for wear.

Figure 7:
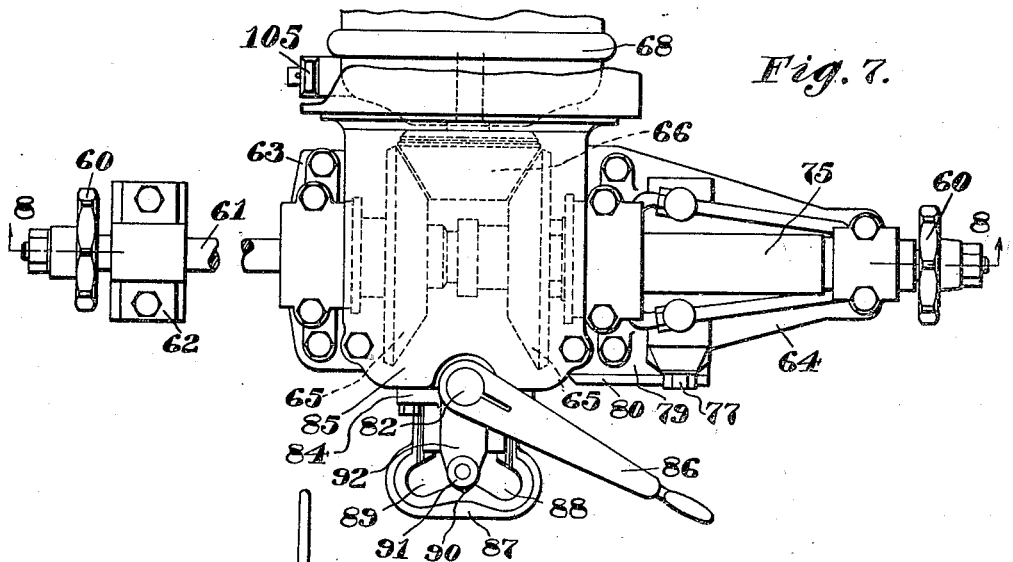
Fig. 7 is a plan view of a portion of the transmission mechanism for actuating the feeding means for the cutting appliances.
Figure 8:
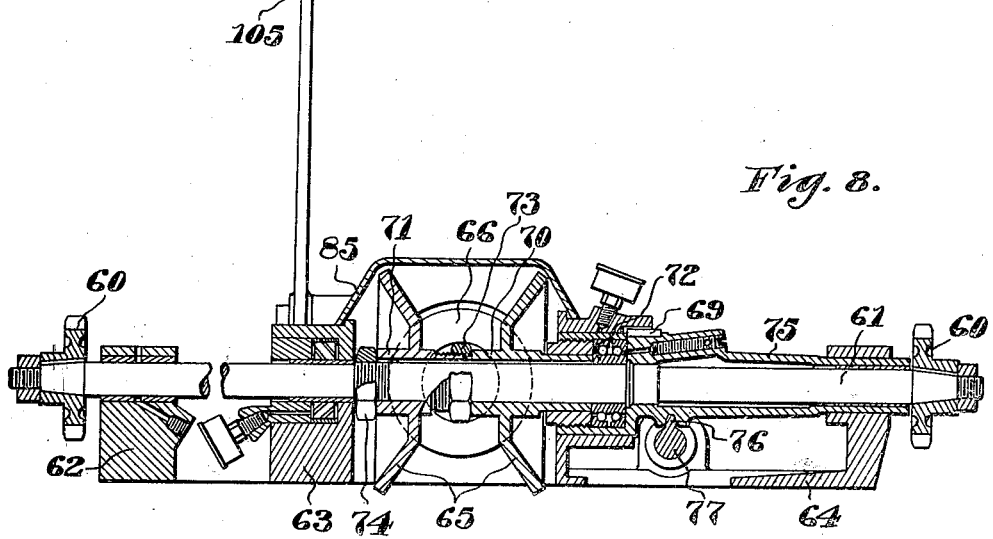
Fig. 8 is a vertical section on line 8—8 of Figs. 2 and 7.
Figure 13:
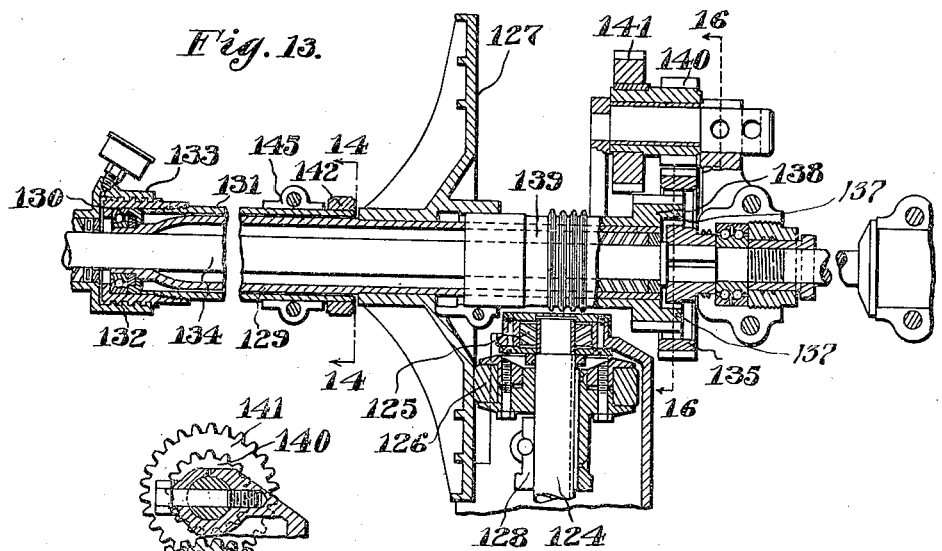
Fig. 13 is a horizontal section, similar to Fig. 9, showing an alternative form of transmission mechanism for operatively connecting the truck motor and truck propelling means.
Figure 16:
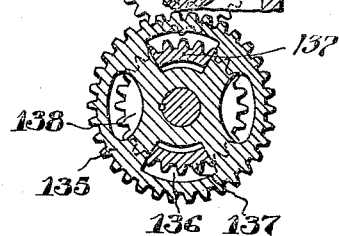
Fig. 16 is a section on line 16—16 of Fig. 13.
Figure 15:
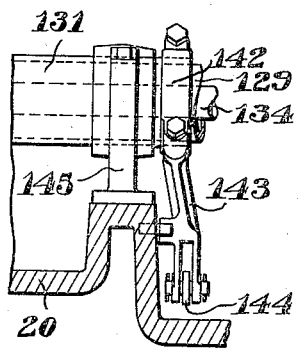
Fig. 15 is a front elevation of the parts shown in Fig. 14.
Figure 14:
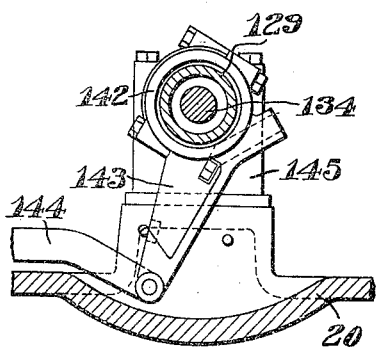
Fig. 14 is a section on line 14—14 of Fig. 13.

For rotating the feed screw 41 in order to raise or lower the head 32 and cutting appliances thereon, the following mechanism is provided: Keyed or otherwise secured to the lower end of the feed screw 41 is a worm gear 47 (see Figs. 5 and 17) journaled in the bracket 42 and meshing with a worm 48 (see also Fig. 6) also journaled in said bracket. The worm 48 is formed with opposite squared ends 49 (see Figs. 2, 5, and 6) extending beyond its journals and to one of which is secured, as by a clamping collar 50, a section of flexible telescopic shafting consisting of telescopic members 51 and 52, connected for rotation in unison, and universal joints 53 and 54 connecting said members 51 and 52, respectively, with the worm 48 and with a short shaft 55 journaled in a bracket 56 (see Figs. 1, 2, and 6) detachably and adjustably secured or clamped to the trunnion shaft 23, as by a cap plate 57 bolted to said bracket. Secured to the shaft 55 is a sprocket wheel 58 connected by a chain 59 with a sprocket wheel 60 secured to a driving shaft 61 (see Figs. 1, 2, 7, and 8) journaled in suitable brackets 62 and 63 and in a sleeve 75 slidably mounted in a bracket 64, said brackets 62, 63, and 64 being secured to the truck frame. The bracket 56 may occupy either of two angular or vertical positions on the trunnion shaft 23, namely that shown in Fig. 1, in which the shaft 55 is supported above said trunnion bar, and that shown in Fig. 4, in which said shaft is supported below said bar, according as the angular or tipping adjustment of the standard 24 is such as to bring said standard more nearly into a vertical or a horizontal position, thereby bringing the shaft 55 and worm 48 as nearly as may be into axial alignment, said bracket, in both positions, holding the sprocket 58 properly spaced from the cooperating sprocket 60 according to the length of the chain 59. The bracket 56 occupies a position adjacent the opposite end of the trunnion bar from that occupied by the standard 24, and when said standard is moved from one end of said bar to the other said bracket is correspondingly moved and inverted, the clamp 50 being released to disconnect the flexible shaft from one of the ends 49 of the worm 48, and said shaft being thereafter connected to the opposite end 49 of said worm. In order that the driving shafts 61 and 55 may be operatively connected by the chain 59 in either position of the bracket 56, said shaft 61 is preferably provided with a sprocket 60 on either end, as shown in Figs. 2, 7, and 8.

Keyed or otherwise secured to the shaft 61, are two oppositely disposed beveled friction gears 65 (see Figs. 2, 7, 8, and 10) each adapted to engage a cooperating beveled friction gear 66 on the shaft 67 of an electric or other motor 68 mounted on the truck frame, said gears 65 and 66 being enclosed in a suitable casing or housing 85. The gears 65 and shaft 61 rotate in suitable bearings in the sleeve 75, which is held against rotation by means of a feather 69 (Fig. 8) engaging a groove in the bracket 64, but said gears, shaft, and sleeve are longitudinally movable as a unit in the bearings in the brackets 62, 63, and 64, to cause either one of the gears 65 to engage the gear 66, thereby causing rotation of the shaft 61 in one or the other direction. Preferably, the gears 65 are so spaced that, by moving the parts into an intermediate position, both of said gears will be held out of engagement with the gear 66, thereby disconnecting the shaft 61 from the motor altogether. In order to permit adjustment of the spacing of the gears 65, to compensate for wear, or for other purposes, said gears are preferably provided with sleeve-like hubs 70 and 71, respectively, the hub 70 engaging at one end the bearing 72 for the shaft 61 in the sleeve 75, and at its opposite end an adjustable nut 73 on the adjacent threaded end of the sleeve 71 the opposite end of which is engaged by an adjustable nut 74 in threaded engagement with the shaft 61.

For the purpose of moving the sleeve 75 longitudinally, in order to shift the gearing, as above described, said sleeve is provided with a notch or recess which is engaged by a tooth 76 (Fig. 8) on a rock shaft 77 (see also Figs. 11 and 12) journaled in bearings in the bracket 64, said rock shaft having fixed thereon a gear segment 78 having teeth meshing with rack teeth on a bar 79 mounted to slide longitudinally in suitable ways 80 in the bracket 64. The bar 79 is provided with a second set of rack teeth which are engaged by the teeth on a gear segment 81 (see also Fig. 10) secured to the lower end of a vertical shaft 82 journaled in a bearing 84 secured to the gear casing or housing 85, said shaft 82 being provided at its upper end with a controlling lever or handle 86. By moving the handle 86 into one opposite position or the other, one or the other of the gears 65 may be engaged with the gear 66, or by moving said handle into an intermediate position, said gears 65 may both be disconnected from the gear 66. Slidably mounted in ways formed in the bottom of the bearing 84, is a yoke 87 having a head provided with two diverging cam slots 88 and 89 and an intermediate notch 90, said slots and notch being engageable by a cam roller 91 carried by the end of an arm 92 projecting from the gear segment 81. The ends of the arms of the yoke 87 are connected by a crosshead 93 between which and the bearing 84 is interposed a spring 94 centered by a projection 95 on said crosshead. In operation, the spring 94 tends to force the head of the yoke 87 toward the shaft 82, so that when, as shown in Fig. 11, the roller 91 is engaged in the notch 90, the mechanism is locked in neutral position with both gears 65 disengaged from the gear 66. Movement of the lever 86 in either direction, to cause engagement of either of the gears 65 with the gear 66, causes the roller 91 to be moved into either one or the other of the cam slots 88 and 89, whereupon said slot, under the action of the spring 94, tends, not only to retain the parts in adjusted position, but to press the same yieldingly in one direction or the other from the neutral position, thereby yieldingly forcing the corresponding gear 65 into engagement with the gear 66. The above described structure forms the subject matter of my copending application Ser. No. 731,983, filed Aug. 14, 1924, which is a division of this application.

The motor 68, besides furnishing power to the feeding mechanism for the cutting devices, as above described, serves also to furnish power to the truck propelling mechanism through connections which will now be described. Said motor 68, as shown in Fig. 2, occupies a position between the openings or recesses 45 in the truck frame, and the shaft 67 of said motor extends transversely of the truck between said openings or recesses. Said shaft 67 is journaled in a bearing 96 (see Figs. 2 and 9) and carries at its end a loosely mounted beveled gear 97 having a sleeve portion 98 adapted to be clutched to a sleeve 99, fixed on the shaft 67, by means of a band clutch 100 of any suitable construction, the controlling member 101 of said clutch being operated by a cam or wedge member 102 movable longitudinally of the shaft 67 by means of a fork 103 carried by a shipper bar 104 under control of a hand lever 105 (see also Figs. 8 and 10). The gear 97 meshes with a gear 106 (see also Fig. 3) secured to a sleeve 107 loosely mounted on a shaft 108 extending longitudinally of the truck frame and journaled in bearings 109, 110, and 111 thereon, said shaft being provided on its ends with worms 112 which engage worm gears 113 on the axles 114 to which the truck wheels 21 are secured. Splined or otherwise secured to the shaft 108 for rotation therewith and longitudinal movement thereon, is a gear 115 provided with pins or lugs 116 adapted to enter corresponding recesses in the end of the sleeve 107, thereby connecting the gear 106 with the shaft 108 for rotation therewith, said gear 115 having a split hub whereby said gear may be clamped in adjusted position on the shaft 108 by means of a bolt 117. Journaled in bearings in a bracket 118 secured to the truck frame is a shaft 119 having an eccentric portion 120 on which is rotatably mounted a sleeve having fixed thereon relatively small and large gears 121 and 122, respectively, adapted, as the shaft 119 is rotated through approximately 180° from the position shown in Fig. 9, to engage, respectively, the gear 115 and a smaller gear portion 123 formed on the sleeve 107. In order, therefore, to drive the shaft 108 at a reduced speed, the gear 115 is moved longitudinally on the shaft to disconnect the pins 116 from the recesses in the sleeve 107, and the shaft 119 turned to engage the gears 121 and 122 with the gears 115 and 123, whereupon said shaft will be rotated through the gear 106, sleeve 107, and gears 123, 122, 121, and 115.

In Figs. 13 to 16 is illustrated a form of frictional transmission gearing adapted to be used in substitution for the gearing last described where a greater variation in truck speed is required, as in undercutting, where it is desirable materially to reduce the truck speed in order to compensate for the swinging movement of the standard. In said figures, 124 denotes the motor shaft (corresponding to the motor shaft 67 shown in Fig. 9) journaled at its end in a bearing 125 supported on the truck frame, said shaft having splined thereon a friction wheel 126 whose periphery is adapted to engage the face of a friction disk 127. The friction wheel 126 is preferably provided with a split hub 128 adapted to be clamped on the shaft 124 in any desired longitudinal position, thereby causing the wheel 126 to engage the disk 127 at any desired distance from the center of the latter, whereby said disk 127 may be driven at different speeds with respect to the shaft 124. The disk 127 is fast upon a sleeve 129 mounted in a bearing 130 in a second sleeve 131 having a coarsely threaded end 132 engaging the threaded interior of a fixed bearing or abutment 133 secured to the truck frame, said sleeve 131 being preferably journaled in a second fixed bearing 145 also secured to the truck frame.

Extending longitudinally through the sleeve 129 is a shaft 134 which corresponds to the shaft 108 shown in Fig. 9 and constitutes the propelling shaft for the truck. Fast upon the shaft 134 is a gear 135 having a web provided with openings 136 (see Figs. 13 and 16) to receive forwardly projecting arms 137 on a gear 138 formed on a sleeve 139 mounted on the sleeve 129 for rotation therewith but adjustable longitudinally thereof to engage or disengage the arms 137 and openings 136. When said arms and openings are interengaged the shaft 134 will be connected, through the gears 135 and 138 and sleeves 139 and 129, with the friction disk 127 for rotation therewith at the same speed. Located at one side of the shaft 134 is an eccentrically mounted pair of back gears 140 and 141, corresponding in construction and function to the gears 121 and 122 shown in Fig. 9, said gears being adapted to engage the gears 135 and 138, respectively, when the arms 137 on the gear 138 are disengaged from the openings 136 in the gear 135, thereby driving the shaft 134 at a reduced speed. The disk 127 may be moved into and out of engagement with the friction gear 126 by turning the sleeve 131 in its bearing 133, thereby moving the sleeve 131, sleeve 129, and disk 127 longitudinally of the shaft. To this end the sleeve 131 is provided with a fixed collar 142 bolted or otherwise secured to said sleeve, said collar being provided with an arm 143 to which is pivoted a rod 144, the opposite end of which may be connected to a suitable controlling lever (not shown) located at any desired point.

In the use of this apparatus for cutting rock, when it is desired to make a substantially vertical cut without a longitudinal swinging movement, the apparatus will be set up substantially as shown in Fig. 1, the shafting 51, 52, including the universal jonts 53, 54 and the ends of the shafting which are connected to the worm gear 48 and the sprocket 58, being in substantial alinement. This shafting is driven from the motor shaft by means of the chains 59. If desired, the chain may be loosened or tightened by an angular adjustment of the shaft support 56 on the trunnion bar 23, the slight movement given the corresponding end of the angularly adjustable shafting being relatively immaterial as regards the position of the different members of this shafting. Similarly, when it is desired to make a substantially horizontal cut without longitudinal swinging, the standard is tilted, as shown in Fig. 4, but the support 56 is adjusted so as to retain the angularly adjustable shafting substantially in alinement instead of as shown in this figure. When thus making cuts at different angles, while keeping the adjustable shafting as nearly in alined position as possible, it will be necessary to remove or add links to the chain 59 so that the proper amount of slack may always be provided for.

When it is desired to make a swinging cut which will demand the usual swinging movement through an arc of about 50°, it is quite essential that the adjustable shafting be given a predetermined angular position with respect to the worm 48, for it has been found that shafting of this type does not work efficiently when the angular displacement of the parts exceeds 25°. In Fig. 6 the worm 48 is shown in the position it occupies when the standard is in a vertical position, the shafting being disposed at an angle of approximately 25° from alined position with the worm so that when the lower end of the standard is swung to the left through an arc of 50° the worm will pass through alined position with respect to the element 51 of this shafting to an angle of 25° on the other side of this shafting. It is obvious that if the standard is to be swung through a smaller arc, say 30°, the element 51 of the shafting will be given an angular displacement of but 15° with respect to the worm 48. By placing the standard and supporting member 56 on the same trunnion bar and so mounting them that they may be angularly adjusted so that the shaft may be kept in alined position or may be moved to a non-alining position to any degree desired, the apparatus may be disposed for any cutting position or cutting movement desired, and the parts will always operate at their highest efficiency.

The cutting apparatus, which is mounted on the standard in such a manner that it may be moved toward or from the work, is of considerable weight, and when it is desired to raise or lower the same so as to change the gang of tools, or for any other purpose, the great weight of these parts necessitates a slowly moving means for shifting these members on the standard. To permit the operator to set these means in operation for shifting the position of the cutting apparatus on the standard, and to leave the same in order that he may loosen the gang of tools or oil the machinery or work on other parts of the apparatus, as desired, without the possibility of breakage due to the movement of the cutting apparatus to the limit of its travel on the standard, friction gearing has been used and means have been provided for automatically forcing this friction gearing into contact and for holding the members in operative position. For this purpose the operator need only throw the handle 86 and the spring pressed yoke will force the friction gears into contact and hold them in contact without requiring the attention of the operator, and should the cutting apparatus reach the limit of its travel on the standard, the friction gears will slip, without breakage of any parts, and the squeaking resulting from this slippage will notify the operator that this limit of travel of the one part or the other has been reached. This means not only saves the time of the operator, but provides against any breakage whether the operator is giving the elevating mechanism his attention or not.

While I have in this application specifically described two forms which my invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. In a machine of the character described, in combination, a truck, a standard adjustably mounted thereon for adjustment in a plane transverse to said truck, cutting appliances on said standard, feeding means on said standard for moving said cutting appliances toward and from the work, a motor on said truck, and driving connections between said motor and said feeding means including shafting adjustable with respect to said standard so as to be substantially perpendicular to the latter in any position thereof in said plane.

2. In a machine of the character described, in combination, a truck, a standard pivotally mounted thereon for swinging movement, cutting appliances on said standard, feeding means on said standard for moving said cutting appliances toward and from the work, a motor on said truck, and driving connections between said motor and said feeding means including shafting a part of which is bodily movable with said standard and a part of which is adjustable with respect to said truck in such manner as to be in substantial alinement with said first mentioned part at the mid-position of the swing of said standard.

3. In a machine of the character described, in combination, a truck, a standard pivotally mounted thereon for swinging movement, cutting appliances on said standard, feeding means on said standard for moving said cutting appliances toward and from the work, a motor on said truck, and driving connections between said motor and said feeding means including multi-part shafting having a portion thereof making a fixed angle with said standard and a portion adjustable with respect to said truck in such manner that the sum of the angles between the parts of said shafting may be a maximum substantially mid-way between the extremes of swing of said standard.

4. In a machine of the character described, in combination, a truck, a standard pivotally mounted thereon for swinging movement, cutting appliances on said standard, feeding means on said standard for moving said cutting appliances toward and from the work, a motor on said truck, and driving connections between said motor and said feeding means including non-rigid shafting fixed at one end to said standard and at the other end to said truck, the latter end of said shafting being driven and being adjustable relative to said truck whereby said shafting may be most nearly straight when said standard occupies a position substantially mid-way of its swinging movement.

5. In a machine of the character described, in combination, a truck, a standard pivotally movable with respect thereto, cutting appliances on said standard, feeding means on said standard for moving said cutting appliances toward and from the work, a motor on said truck, and driving connections between said motor and said feeding means including shafting adjustable with respect to said standard so that the latter is substantially perpendicular to said shafting when midway of its pivotal movement.

6. In a machine of the character described, in combination, a truck, a standard pivotally movable with respect thereto, cutting appliances on said standard, feeding means on said standard for moving said cutting appliances toward and from the work, a motor on said truck, driving connections between said motor and said feeding means including shafting having parts angularly movable relative to each other, and means for adjusting one of said parts so that the other may be moved into alinement therewith by said standard when the latter is midway of its pivotal movement.

7. In a machine of the character described, in combination, a truck, a standard pivotally movable with respect thereto, cutting appliances on said standard, feeding means on said standard for moving said cutting appliances toward and from the work, a motor on said truck, and driving connections between said motor and said feeding means including shafting having a part held in fixed relation to said standard and a part adjustable with respect to said truck so that when said standard is at the middle point of its pivotal movement the two parts of said shafting will be in substantial alinement.

8. In a machine of the character described, in combination, a truck, a standard pivotally mounted thereon, cutting appliances on said standard, feeding means on said standard for moving said cutting appliances toward and from the work, a motor on said truck, a plural-part, jointed shaft for actuating said feeding means, a support for one part of said shaft on said truck adjustable whereby the parts of said shaft may approach alinement when said standard is at its median position of movement, and means for driving said shaft from said motor.

9. In a machine of the character described, in combination, a truck, a standard pivotally mounted thereon, cutting appliances on said standard, feeding means on said standard for moving said cutting appliances toward and from the work, a motor on said truck, a shaft for actuating said feeding means and having a part disposable at various angles to another part thereof by movement of said standard, a vertically adjustable support for said second mentioned part of the shaft, and means for driving said shaft from said motor, said support being adjustable to cause the bringing of the parts of said shaft into alinement at the median position of movement of said standard.

10. In a machine of the character described, in combination, a truck, a standard pivotally mounted thereon, cutting appliances on said standard, feeding means on said standard for moving said cutting appliances toward and from the work, a motor on said truck and driving connections including substantially horizontally disposed adjustable shafting having a part in fixed relation to said standard and a part adapted to be moved toward or from alined position with respect to said first mentioned part for actuating said feeding means from said motor.

11. In a machine of the character described, in combination, a truck, a standard mounted thereon for adjustment in a given plane, cutting appliances on said standard, feeding means on said standard for moving said cutting appliances toward and from the work, a motor on said truck, a substantially horizontally disposed adjustable shafting having a driving connection with said feeding means, a support therefor adjustably mounted on said truck for movement in a plane substantially parallel to said first named plane, whereby said shafting may bear a relatively fixed relation to said standard and means for driving said shaft from said motor.

12. In a machine of the character described, in combination, a truck, a standard mounted for angular adjustment thereon, cutting appliances on said standard, feeding means on said standard for moving said cutting appliances toward and from the work, a motor on said truck, an angularly adjustable shaft connected with said feeding means for actuating the same, an angularly adjustable support for said shaft on said truck for changing the alinement of said shaft, and means for driving said shaft from said motor.

13. In a machine of the character described, in combination, a truck, a trunnion bar on said truck, a standard adjustably supported by said trunnion bar, cutting appliances on said standard, feeding means on said standard for moving said cutting appliances toward and from the work, a motor on said truck, a shaft for actuating said feeding means, a bracket adjustably mounted on said trunnion bar and carrying a bearing for said shaft, and transmission connections between said shaft and motor.

14. In a machine of the character described, in combination, a truck, a trunnion bar on said truck, a standard angularly adjustable on said trunnion bar, cutting appliances on said standard, feeding means on said standard for moving said cutting appliances toward and from the work, a motor on said truck, a shaft operatively connected with said feeding means for actuating the same, a bracket angularly adjustable on said trunnion bar and carrying a bearing for said shaft, and transmission mechanism connecting said shaft and motor.

15. In a machine of the character described, in combination, a truck, a standard carried by said truck and longitudinally adjustable thereon, cutting appliances on said standard, feeding means on said standard for moving said cutting appliances toward and from the work, a motor on said truck, a shaft operatively connected with said feeding means for actuating the same, a support carried by said truck and longitudinally adjustable thereon, said support having a bearing for said shaft, and transmission mechanism operatively connecting said shaft and motor.

16. In a machine of the character described, in combination, a truck, a trunnion bar carried by said truck, a standard supported by said trunnion bar and longitudinally adjustable thereon, cutting appliances on said standard, feeding means on said standard for moving said cutting appliances toward and from the work, a motor on said truck, a shaft operatively connected with said feeding means for actuating the same, a bracket carried by said trunnion bar and longitudinally adjustable thereon, said bracket having a bearing for said shaft, and transmission mechanism connecting said shaft and motor.

17. In a machine of the character described, in combination, a truck, a standard adjustably mounted thereon, cutting appliances on said standard, a feed screw on said standard for moving said cutting appliances toward and from the work, worm gearing carried by said standard for rotating said feed screw, a motor on said truck, and driving connections including shafting for actuating said worm gearing from said motor and adapted to be moved into substantially alined position therewith.

18. In a machine of the character described, in combination, a truck, a trunnion bar carried by said truck, a standard supported by said trunnion bar and longitudinally adjustable thereon, means whereby said standard may be pivoted about a transverse axis for swinging movement, cutting appliances on said standard, a feed screw on said standard for moving said cutting appliances toward and from the work, double ended worm gearing carried by said standard for rotating said feed screw, a motor on said truck, a shaft operatively connected with said worm gearing for actuating the same, a bracket carried by said trunnion bar and longitudinally and angularly adjustable thereon to vary the alinement between said shaft and said worm gearing whereby said shaft may be in substantial alinement with said worm gearing when the standard is in midposition of its swing, said bracket having a bearing for said shaft, and transmission mechanism connecting said shaft and motor.

19. In a machine of the character described, in combination, a truck, a trunnion bar carried by said truck, a standard supported by said trunnion bar and adjustable with respect thereto in a transverse plane, cutting appliances on said standard, a feed screw on said standard for moving said cutting appliances toward and from the work, double ended worm gearing carried by said standard for rotating said feed screw, a motor on said truck, a shaft operatively connected with said worm gearing for actuating the same, and a bracket carried by said trunnion bar and adjustable thereon to maintain a substantial alinement between said shaft and said worm gearing irrespective of adjustment of said standard, said bracket having a bearing for said shaft, and transmission mechanism connecting said shaft and motor.

20. In a machine of the character described, in combination, a truck, a standard adjustably mounted thereon, cutting appliances on said standard, feeding means on said standard for moving said cutting appliances toward and from the work, an adjustable shaft for actuating said feeding means, a transmission member on said shaft, a motor on said truck, a driving shaft actuated by said motor, and adjustable driving connections between said driving shaft and transmission member.

21. In a machine of the character described, in combination, a truck, a standard mounted for angular adjustment thereon, cutting appliances on said standard, feeding means on said standard for moving said cutting appliances toward and from the work, a motor on said truck, an angularly adjustable shaft for actuating said feeding means, an angularly adjustable support for said shaft on said truck for adjusting said shaft toward a position perpendicular to said standard, a transmission member on said shaft, a driving shaft actuated by said motor, and driving connections between said driving shaft and transmission member.

22. In a machine of the character described, in combination, a truck, a standard mounted for angular adjustment thereon and pivoted for swinging movement with respect thereto in a plane parallel to the length of the truck, cutting appliances on said standard, feeding means on said standard for moving said cutting appliances toward and from the work, a motor on said truck, an angularly adjustable shaft for actuating said feeding means, an angularly adjustable support for said shaft on said truck for adjusting said shaft toward and from a position perpendicular to said standard, a transmission member on said shaft, a driving shaft actuated by said motor, and driving connections between said driving shaft and transmission member.

23. In a machine of the character described, in combination, a truck, a standard adjustably mounted thereon, cutting appliances on said standard, feeding means on said standard for moving said cutting appliances toward and from the work, a shaft for actuating said feeding means, an adjustable mounting for said shaft, a sprocket on said shaft, a motor on said truck, a driving shaft actuated by said motor and relative to which said first mentioned shaft is adjustable, a sprocket on said driving shaft, and a chain connecting said sprockets, whereby freedom of relative adjustment between said shafts is provided.

24. In a machine of the character described, in combination, a truck, a trunnion bar carried by said truck, a standard supported by said trunnion bar and longitudinally adjustable thereon, cutting appliances on said standard, feeding means on said standard for moving said cutting appliances toward and from the work, a shaft for actuating said feeding means, a bracket carried by said trunnion bar and longitudinally adjustable thereon and rotatable about the axis thereof, said bracket having a bearing for said shaft, a sprocket on said shaft, a motor on said truck, a driving shaft actuated by said motor, a sprocket on said driving shaft, and a chain connecting said sprockets.

25. In a machine of the character described, in combination with a truck, an adjustable standard thereon, cutting appliances on said standard, feeding means on said standard for moving said cutting appliances toward and from the work, a motor on said truck, and driving connections for actuating said feeding means from said motor including telescopic angularly adjustable plural-part shafting having a part thereof adapted to be moved toward or from coaxial position with respect to the remainder thereof.

26. In a machine of the character described, in combination, a truck, a standard adjustably mounted thereon, cutting appliances on said standard, feeding means on said standard for moving said cutting appliances toward and from the work, a motor on said truck, and driving connections including adjustable telescopic shafting for actuating said feeding means from said motor, said shafting being mounted for adjustment of translation independently of the motor.

27. In a machine of the character described, in combination, a truck, a standard adjustably mounted thereon, cutting appliances on said standard, feeding means on said standard for moving said cutting appliances toward and from the work, a motor on said truck, and driving connections including adjustable telescopic shafting for actuating said feeding means from said motor, one end of said shafting being connected for driving with said motor and being mounted for adjustment involving movement of translation.

28. In a machine of the character described, in combination, a truck, a standard adjustably mounted thereon, cutting appliances on said standard, feeding means on said standard for moving said cutting appliances toward and from the work, a motor on said truck, an adjustable plural-part shaft for actuating said feeding means, a support for said shaft for normally holding said shaft with the parts thereof in alined position, and means for driving said shaft from said motor.

29. In a machine of the character described, in combination, a truck, a standard adjustably mounted thereon, cutting appliances on said standard, feeding means on said standard for moving said cutting appliances toward and from the work, a motor on said truck, a telescopic shaft operatively connected with said feeding means for actuating the same, an adjustable support for said shaft normally fixed on said truck, and adjustable transmission mechanism operatively connecting said shaft and motor.

30. In a machine of the character described, in combination, cutting appliances, feeding means having a positively limited range of movement for moving said cutting appliances toward and from the work, a motor, and driving connections including frictional gearing for actuating said feeding means from said motor.

31. In a machine of the character described, in combination, a truck, a standard adjustably mounted thereon, cutting appliances on said standard, feeding means on said standard for moving said cutting appliances toward and from the work, a motor on said truck, and driving connections including adjustable plural-part shafting having means for adjusting a part thereof into axial alinement with the remainder thereof, and frictional gearing for actuating said feeding means from said motor.

32. In a machine of the character described, in combination, truck, a standard adjustably mounted thereon, cutting appliances on said standard, feeding means on said standard for moving said cutting appliances toward and from the work, said feeding means having a positively limited range of movement, a motor on said truck, and driving connections including reversible frictional gearing for actuating said feeding means from said motor.

33. In a machine of the character described, in combination, a truck, a standard adjustably mounted thereon, cutting appliances on said standard, feeding means on said standard for moving said cutting appliances toward and from the work, said feeding means having a positively limited range of movement, a motor on said truck, a shaft driven by said motor, a friction gear on said motor shaft, a driving shaft, a pair of friction gears on said driving shaft alternatively engageable with said first named friction gear, and adjustable driving connections for actuating said feeding means from said driving shaft.

34. A channeling machine having, in combination, cutting appliances, feeding means therefor including an actuating motor, means for controlling operative connection between said said motor and feeding means including manually controlled means having neutral and operative positions, and means whereby said latter means after being displaced from said neutral position is thereafter automatically thrown into operative position.

35. A channeling machine having, in combination, cutting appliances, feeding means therefor including an actuating motor, means for controlling operative connection between said motor and feeding means including manually controlled means having neutral and operative positions, and means whereby said latter means after being displayed from said neutral position is thereafter yieldingly thrown into operative position.

36. A channeling machine having, in combination, cutting appliances, forward and reversible feeding means therefor including an actuating motor, means for controlling operative connection between said motor and feeding means including manually controlled means having neutral and operative positions, and means whereby said latter means after being displaced from said neutral position is thereafter automatically thrown into operative position.

37. In a machine of the character described, in combination, cutting appliances, feeding means for moving said cutting appliances toward and from the work, said feeding means having a positively limited range of feeding movement, a driving shaft and connections for actuating said feeding means, a motor, a motor shaft having a friction gear, a plurality of friction gears on said driving shaft alternatively engageable with said first named friction gear, and controlling means for yieldingly pressing either of said last named gears into engagement with said first named gear.

38. In a machine of the character described, in combination, a truck, a standard adjustably mounted thereon, cutting appliances on said standard, feeding means on said standard for moving said cutting appliances toward and from the work, said feeding means having a positively limited range of feeding movement, a motor on said truck, a shaft driven by said motor, a friction gear on said motor shaft, a driving shaft, a pair of friction gears on said driving shaft alternatively engageable with said first named friction gear, a shaft for actuating said feeding means, a bearing for said last named shaft, a transmission member on said last named shaft, and driving connections between said driving shaft and transmission member.

39. In a machine of the character described, in combination, cutting appliances, feeding means for moving said cutting appliances toward and from the work, said feeding means having a positively limited range of feeding movement, a driving shaft and connections for actuating said feeding means, a motor, a motor shaft having a friction gear, a pair of friction gears on said driving shaft alternatively engageable with said first named friction gear, a controlling lever for moving either of said last named gears into engagement with said first named gear, and means for yieldingly forcing said lever in one direction or the other for pressing one or the other of said last named gears into engagement with said first named gear.

40. In a machine of the character described, in combination, cutting appliances, feeding means for moving said cutting appliances toward and from the work, said feeding movement having a positively limited range of feeding movement, a driving shaft and connections for actuating said feeding means, a motor, a motor shaft having a friction gear, a pair of friction gears on said driving shaft alternatively engageable with said first named friction gear, a sleeve longitudinally movable in either direction to engage one or the other of said first named friction gears with said last named friction gear, a gear segment operatively connected with said sleeve, a rack bar cooperating with said gear segment, a second gear segment cooperating with said rack bar, a shaft to which said last named gear segment is secured, and a controlling lever for turning said shaft.

41. In a machine of the character described, in combination, cutting appliances, feeding means for moving said cutting appliances toward and from the work, said feeding means having a positively limited range of feeding movement, a driving shaft and connections for actuating said feeding means, a motor, a motor shaft having a friction gear, a pair of friction gears on said driving shaft, a gear segment operatively connected with said last named friction gears for moving one or the other thereof into engagement with said first named friction gear, a rack bar cooperating with said gear segment, a second gear segment cooperating with said rack bar, a controlling lever connected with said last named gear segment, and means for yieldingly forcing said lever in one direction or the other or for retaining the same in an intermediate position.

42. In a machine of the character described, in combination, cutting appliances, feeding means for moving said cutting appliances toward and from the work, said feeding means having a positively limited range of feeding movement, a motor, driving connections including reversible frictional gearing for actuating said feeding means from said motor, a controlling lever for said gearing, a spring pressed sliding yoke provided with cam slots, and means cooperating with said cam slots and operatively connected with said lever for moving said lever in one direction or the other.

43. In a machine of the character described, in combination, cutting appliances, feeding means for moving said cutting appliances toward and from the work, said feeding means having a positively limited range of feeding movement, a motor, driving connections including reversible frictional gearing for actuating said feeding means from said motor, a controlling lever for said gearing, an arm connected with said controlling lever, a cam roller on said arm, and a spring pressed sliding yoke having oppositely extending cam slots and an intermediate notch engaged by said roller.

44. In a machine of the character described, in combination, a truck, a standard mounted thereon for tipping movement in a direction transverse thereto, cutting appliances on said standard, and a motor on said standard for actuating said cutting appliances, said truck having a recess to receive said motor when said standard is adjusted into an approximately horizontal position.

45. In a machine of the character described, in combination, a truck, means for propelling said truck, a standard mounted on said truck for tipping movement in a direction transverse thereto, said standard being adjustable to opposite ends of said truck, cutting appliances on said standard, a motor on said standard for actuating said cutting appliances, said truck having recesses at opposite sides of its longitudinal center adapted to receive said motor when said standard is adjusted into an approximately horizontal position in either of its longitudinal positions, and a motor and connections for actuating said truck propelling means, said last named motor and connections being located on said truck between said recesses.

46. In a machine of the character described, in combination, a truck, means for propelling said truck, a standard mounted on said truck for tipping movement in a direction transverse thereto, said standard being adjustable to opposite ends of said truck, cutting appliances on said standard, a motor on said standard for actuating said cutting appliances, said trunk having recesses at opposite sides of its longitudinal center adapted to receive said motor when said standard is adjusted into an approximately horizontal position in either of its longitudinal positions, a longitudinally extending shaft on said truck for propelling the same, said shaft being located at one side of said recesses, a motor on said truck between said recesses, a transversely extending shaft driven by said motor, and gearing connecting said motor shaft and propelling shaft.

47. In a machine of the character described, in combination, a truck, a swiveled standard adjustably mounted thereon for adjustment in a vertical plane and for a swinging movement in a plane transverse to said first named plane, cutting appliances on said standard, feeding means including a driven member on said standard for moving said cutting appliances toward and from the work, and driving means for said feeding means including angularly adjustable shafting adapted to be moved into substantial alinement with said driven member when said standard is stationary and to be moved into an angular relation thereto when said standard is to be given a swinging movement.

48. In a machine of the character described, in combination, a truck, a swiveled standard adjustably mounted thereon for adjustment in a vertical plane and for a swinging movement in a plane transverse to said first named plane, cutting appliances on said standard, feeding means including a driven member on said standard for moving said cutting appliances toward and from the work, driving means for said feeding means including angularly adjustable shafting adapted to be moved into substantial alinement with said driven member when said standard is stationary and to be moved into an angular relation thereto when said standard is to be given a swinging movement, and an adjustable support for said shafting.

49. In a machine of the character described, in combination, a truck, a standard mounted thereon for tipping movement in a direction transverse thereto, cutting appliances on said standard, a motor on and projecting laterally from said standard for actuating said cutting appliances, feeding means on said standard for moving said cutting appliances toward and from the work, said truck being formed to receive said motor when said standard is adjusted into approximately horizontal position, and means on said truck for driving said feeding means in any position of the standard.

50. In a machine of the character described, in combination, a truck, a standard mounted thereon for tipping movement in a direction transverse thereto, cutting appliances on said standard, a motor on said standard for actuating said cutting appliances, means on said standard for feeding said cutting appliances with respect to the work including a driving member, said truck being formed to receive said motor when said standard is adjusted into an approximately horizontal position, and a driving shaft for said driving member adjustable into alinement therewith irrespective of the position of said standard.

51. In a machine of the character described, in combination, a truck, means for propelling the truck, a standard mounted on said truck for tipping movement in a direction transverse thereto, said standard being adjustable to opposite ends of said truck, cutting appliances on said standard, a motor on said standard for actuating said cutting appliances, feeding means on said standard for varying the position of said cutting appliances, power means adjacent the middle of said truck including a transverse shaft, a motor actuating said shaft, said truck being formed to permit the swinging of said standard into substantially horizontal position at either side of said last mentioned motor, driving connections between said transverse shaft and the propelling means for said truck, and a connection between the other end of said shaft and said cutting appliance feeding means whereby the latter may be actuated by said transverse shaft.

52. In a machine of the character described, in combination, a truck, means for propelling the truck, a standard mounted on said truck for tipping movement in a direction transverse thereto, said standard being adjustable to opposite ends of said truck, cutting appliances on said standard, a motor on said standard for actuating said cutting appliances, feeding means on said standard for varying the position of said cutting appliances, a transverse shaft adjacent the middle of said truck, a motor for actuating said shaft, said truck being formed to permit the swinging of said standard into substantially horizontal position at either side of said last mentioned motor, driving connections between said transverse shaft and the propelling means for said truck, a longitudinal shaft arranged at one end of said transverse shaft and driven thereby, and means for connecting said longitudinal shaft with said cutting appliance feeding means, said connecting means being adjustable to cooperate therewith irrespective of the end of the truck at which the standard may be located.

53. In a machine of the character described, in combination, a truck, means for propelling said truck, a standard mounted on said truck for tipping movement in a direction transverse thereto, said standard being adjustable to opposite ends of said truck, cutting appliances on said truck, means mounted on said standard for actuating the same, feeding means for said cutting appliances carried by said standard, a motor located adjacent the middle portion of said truck, a driving connection from said motor for said propelling means, a reversible driving connection between said motor and said cutting appliance feeding means, and manual control means for said last mentioned means, said truck being formed to permit tilting of said standard when at either end of the truck into such position that the cutting appliance actuating mechanism lies adjacent said motor.

54. In a machine of the character described, in combination, a truck, a standard adjustably mounted thereon for pivotal movement about transverse and longitudinally disposed axes, cutting appliances on said standard, and means for effecting operation of said cutting appliances including a rotatable member on said standard, a motor on said truck, and driving connections between said rotatable member and said motor including shafting, and means for journalling the same at one end on said standard and at the other end on said truck, the latter end of said shafting being operatively connected to said motor for driving thereby, and the journalling means at said latter end being adjustable relative to said truck to substantially equalize the extreme deviations of said shafting from a straight line upon swinging movement of said standard about said transverse axis.

55. A cutting mechanism comprising a base, a standard pivoted thereon, cutting means carried by said standard, feeding means for said cutting means including a rotatable member whose axis is parallel to the axis of said pivot and is carried by said standard, and another member disposed coaxial with the pivotal axis of said standard.

56. A cutting mechanism comprising a base, a standard pivoted thereon, cutting means carried by said standard, feeding means for said cutting means including a rotatable member whose axis is parallel to the axis of said pivot and is carried by said standard, and another member disposed coaxial with and movable about the pivotal axis of said standard.

57. A cutting mechanism comprising a base, a standard pivoted thereon, cutting means carried by said standard, feeding means for said cutting means including a rotatable member whose axis is parallel to the axis of said pivot and is carried by said standard, and another member disposed coaxial with the pivotal axis of said standard, and means whereby said members are operatively connected throughout any pivotal movement of said standard.

58. A cutting mechanism comprising a base, a standard pivoted thereon, cutting means carried by said standard, feeding means for said cutting means including a rotatable member whose axis is parallel to the axis of said pivot and is carried by said standard, and another member disposed coaxial with the pivotal axis of said standard, the axes of said rotatable members remaining in fixed relation throughout movement.

59. A cutting machine comprising a base, a standard pivoted thereon, cutting means carried by said standard, feeding means for said cutting means including a member rotatable about an axis parallel to said pivotal axis and carried by said standard, and another pivotal member having its axis parallel to the axis of said other member throughout any pivotal movement of said standard.

60. A cutting mechanism comprising a base, a standard supported thereon and having pivotal movement both transversely and longitudinally of said base, cutting means carried by said standard, feeding means for said cutting means including a member rotatably carried by said standard about an axis parallel to said transverse axis, and another member disposed coaxially with the transverse pivoted axis.

61. A channeling mechanism comprising a truck, cutting appliances thereon, feeding and driving mechanism for said appliances and said truck including a common motor having a shaft for actuating the same from each end of said shaft.

62. A channeling mechanism comprising a wheeled truck, cutting appliances thereon, means for driving said truck including a shaft for actuating the wheels of said truck, a motor having a shaft, gearing operatively connecting said shaft for driving said truck at one speed, and reduction gearing adapted to be thrown into and out of engagement with said other gearing for driving said truck at another speed.

63. A channeling mechanism comprising a wheeled truck, cutting appliances thereon, means for driving said truck including a shaft for actuating the wheels of said truck, a motor having a shaft, gearing operatively connecting said shaft for driving said truck at one speed, and reduction gearing adapted to be thrown transversely to the axis of rotation into and out of engagement with said other gearing for driving said truck at another speed.

64. In a feeding mechanism, an element operative on rotation to effect feed, a motor, means for connecting said motor and element including co-operating friction power transmission means, and controlling means therefor including a manual lever and means operative on displacement of said lever from its median position automatically to apply a predetermined yielding force to said friction power transmission means, which force cannot be exceeded by further movement of said lever.

65. In a frictional feeding mechanism, an element movable in opposite directions to cause reverse frictional feeds, a member operatively connected thereto for effecting such movements of said element, and spring means for forcing said member with predetermined pressure in each direction constantly under a compression at least equal to the pressure which will be exerted in the forcing of said member as described but normally maintained inoperative to effect movement of said member.

In testimony whereof I affix my signature.

HENRY H. MERCER.